US012453953B1

(12) United States Patent
Amin et al.

(10) Patent No.: US 12,453,953 B1
(45) Date of Patent: Oct. 28, 2025

(54) $Co_2O_3$—$Bi_2O_3$@$SiO_2$ NANOCOMPOSITE AND METHOD OF PREPARATION THEREOF

(71) Applicant: IMAM MOHAMMAD IBN SAUD ISLAMIC UNIVERSITY, Riyadh (SA)

(72) Inventors: Mutaz Ezzeldien Salih Amin, Riyadh (SA); Rasmiah Saad Almufarij, Riyadh (SA); Babiker Yagoub Elhadi Abdulkhair, Riyadh (SA)

(73) Assignee: IMAM MOHAMMAD IBN SAUD ISLAMIC UNIVERSITY, Riyadh (SA)

( * ) Notice: Subject to any disclaimer, the term of this patent is extended or adjusted under 35 U.S.C. 154(b) by 0 days.

(21) Appl. No.: 19/066,790

(22) Filed: Feb. 28, 2025

(51) Int. Cl.
*B01J 20/10* (2006.01)
*B01J 20/28* (2006.01)
*B01J 20/30* (2006.01)

(52) U.S. Cl.
CPC ....... *B01J 20/103* (2013.01); *B01J 20/28007* (2013.01); *B01J 20/28059* (2013.01); *B01J 20/28061* (2013.01); *B01J 20/28064* (2013.01); *B01J 20/28066* (2013.01); *B01J 20/28071* (2013.01); *B01J 20/28073* (2013.01); *B01J 20/28076* (2013.01); *B01J 20/28083* (2013.01); *B01J 20/3021* (2013.01); *B01J 20/305* (2013.01); *B01J 20/3078* (2013.01); *B01J 2220/42* (2013.01); *B01J 2220/4806* (2013.01)

(58) Field of Classification Search
CPC ............ B01J 20/28007; B01J 20/28059; B01J 20/28061; B01J 20/28064; B01J 20/28066; B01J 20/28071; B01J 20/28073; B01J 20/28076; B01J 20/28083; B01J 20/3021; B01J 20/305; B01J 20/3078
See application file for complete search history.

(56) References Cited

U.S. PATENT DOCUMENTS

2001/0009884 A1 7/2001 Moskovitz et al.
2024/0149262 A1 5/2024 Losego et al.

FOREIGN PATENT DOCUMENTS

CN 113441112 A 9/2021
CN 115212908 A 10/2022
JP 2009-200364 A 9/2009

OTHER PUBLICATIONS

Shanavas et al., Journal Environmental Chemical Engineering, (2022), 10(2), 107243(1-9).*
Yan Chen, et al., "Constructing 3D magnetic flower-like Fe3O4@SiO2@Co3O4@BiOCl heterojunction photocatalyst for degrading rhodamine B", Environmental Science and Pollution Research, vol. 29, Jul. 8, 2022, pp. 87310-87318.
Debapriya Pradhan, et al., "Effortless Fabrication of Bi2O3—Co3O4 Nanocomposite Catalyst: Harnessing Photocatalytic Power for Efficient Cationic Dye Degradation", Chemistry Select, vol. 9, e202400217, 2024, 19 pages.
Soyoung Baek, et al., "Synthesis of Fe2O3/Mn2O3 Nanocomposites and Impregnated Porous Silicates for Dye Removal: Insights into Treatment Mechanisms", Catalysts 2022, vol. 12, 1045, Sep. 14, 2022, 15 pages.

* cited by examiner

*Primary Examiner* — Yong L Chu
(74) *Attorney, Agent, or Firm* — Oblon, McClelland, Maier & Neustadt, L.L.P.

(57) ABSTRACT

A $Co_2O_3$—$Bi_2O_3$@$SiO_2$ nanocomposite material includes $Co_2O_3$—$Bi_2O_3$@$SiO_2$ nanocomposite particles having a granular morphology with an average diameter in a range from 10 to 30 nanometers (nm). The $Co_2O_3$—$Bi_2O_3$@$SiO_2$ nanocomposite material has a Brunauer-Emmett-Teller (BET) surface area of greater than or equal to 70 square meters per gram ($m^2 \cdot g^{-1}$). The $Co_2O_3$—$Bi_2O_3$@$SiO_2$ nanocomposite material has an adsorption capacity for ciproflaxin of greater than or equal to 70 milligrams per gram ($mg \cdot g^{-1}$).

20 Claims, 5 Drawing Sheets

$Co_2O_3$—$Bi_2O_3$@$SiO_2$ NANOCOMPOSITE AND METHOD OF PREPARATION THEREOF

BACKGROUND

Technical Field

The present disclosure is directed towards a method of manufacturing a nanocomposite, and more particularly, a method of manufacturing a nanocomposite of cobalt oxide ($Co_2O_3$), bismuth oxide ($Bi_2O_3$), and silicon dioxide ($SiO_2$), especially $Co_2O_3$—$Bi_2O_3$@$SiO_2$.

Description of Related Art

The "background" description provided herein is for the purpose of generally presenting the context of the disclosure. Work of the presently named inventors, to the extent it is described in this background section, as well as aspects of the description which may not otherwise qualify as prior art at the time of filing, are neither expressly nor impliedly admitted as prior art against the present disclosure.

The presence of organic dyes and antibiotics in water has become a global issue, with the growing population and increasing demand for milk and meat, industrial farming practices have expanded, leading to widespread use of antibiotics in in farming. These antibiotics are only partially metabolized by animals, with the remainder being excreted unchanged in urine and feces, ultimately entering sewage systems and contaminating water resources. Numerous studies have confirmed high concentrations of antibiotics in seawater, raising serious concerns about the safety and environmental impact of discharging effluent into the ocean leading to contamination that harms aquatic life and the human water quality. Prolonged exposure to these pollutants can result in ecosystem degradation, loss of biodiversity, and contamination of food sources, further escalating environmental and health risks.

Water purification methods include membranes, oxidation, precipitation, coagulation, aerobic decomposition, and bacterial destruction. While these approaches are effective in removing a wide range of pollutants, they have limitations when it comes to certain contaminants. Conventional wastewater treatment processes often fail to completely eliminate these micropollutants, allowing them to enter water resources through the discharge of treated effluent. In contrast to traditional methods, nanomaterials offer advancements in addressing environmental challenges through photocatalysis and adsorption processes.

Previous research has extensively explored the synthesis and applications of individual components such as cobalt oxide ($Co_2O_3$), bismuth oxide ($Bi_2O_3$), and silicon dioxide ($SiO_2$), each offering unique properties like photocatalytic activity, structural stability, adsorption and environmental remediation potential. However, these studies often focus on single-phase materials or binary composites, which limit their multifunctionality and application scope. Hence, there arises a requirement for a better and more efficient method of manufacturing nanomaterials for environmental pollution remediation.

Each of the aforementioned synthesis methods suffers from one or more drawbacks hindering their adoption. Accordingly, it is one object of the present disclosure to provide a synthesis method and system that may circumvent the drawbacks, such as complexity, high cost, lack of multi-phase integration and nanoscale precision, of the materials known in the art.

SUMMARY

In an exemplary embodiment, a $Co_2O_3$—$Bi_2O_3$@$SiO_2$ nanocomposite material is described. The $Co_2O_3$—$Bi_2O_3$@$SiO_2$ nanocomposite material includes $Co_2O_3$@$Bi_2O_3SiO_2$ nanocomposite particles having a granular morphology with an average diameter in a range from 10 to 30 nanometers (nm). The $Co_2O_3$—$Bi_2O_3$@$SiO_2$ nanocomposite material has a Brunauer-Emmett-Teller (BET) surface area of greater than or equal to 70 square meters per gram ($m^2 \cdot g^{-1}$). The $Co_2O_3$—$Bi_2O_3$@$SiO_2$ nanocomposite material has an adsorption capacity for ciproflaxin of greater than or equal to 70 milligrams per gram ($mg \cdot g^{-1}$).

In some embodiments, the $Co_2O_3$—$Bi_2O_3$@$SiO_2$ nanocomposite material has a BET surface area of greater than or equal to 75 $m^2 \cdot g^{-1}$.

In some embodiments, the $Co_2O_3$—$Bi_2O_3$@$SiO_2$ nanocomposite material has a BET surface area of greater than or equal to 80 $m^2 \cdot g^{-1}$.

In some embodiments, the $Co_2O_3$—$Bi_2O_3$@$SiO_2$ nanocomposite material has an average pore diameter in a range from 4 to 10 nm.

In some embodiments, the $Co_2O_3$—$Bi_2O_3$@$SiO_2$ nanocomposite material has an average pore diameter in a range from 5 to 8.5 nm.

In some embodiments, the $Co_2O_3$—$Bi_2O_3$@$SiO_2$ nanocomposite material has an average pore diameter in a range from 6.5 to 8 nm.

In some embodiments, the $Co_2O_3$—$Bi_2O_3$@$SiO_2$ nanocomposite material has an average pore volume greater than or equal to 0.060 cubic centimeters per gram ($cm^3 \cdot g^{-1}$).

In some embodiments, the $Co_2O_3$—$Bi_2O_3$@$SiO_2$ nanocomposite material has an average pore volume greater than or equal to 0.070 $cm^3 \cdot g^{-1}$.

In some embodiments, the $Co_2O_3$—$Bi_2O_3$@$SiO_2$ nanocomposite material has an average pore volume greater than or equal to 0.080 $cm^3 \cdot g^{-1}$.

In some embodiments, the $Co_2O_3$—$Bi_2O_3$@$SiO_2$ nanocomposite material has an adsorption capacity for ciproflaxin of greater than or equal to 75 $mg \cdot g^{-1}$.

In some embodiments, the $Co_2O_3$—$Bi_2O_3$@$SiO_2$ nanocomposite material has an adsorption capacity for indigo carmine of greater than or equal to 75 $mg \cdot g^{-1}$.

In some embodiments, the $Co_2O_3$—$Bi_2O_3$@$SiO_2$ nanocomposite material has an adsorption capacity for indigo carmine of greater than or equal to 85 $mg \cdot g^{-1}$.

In some embodiments, the $Co_2O_3$—$Bi_2O_3$@$SiO_2$ nanocomposite material has an adsorption capacity for fuchsin of greater than or equal to 190 $mg \cdot g^{-1}$.

In some embodiments, the $Co_2O_3$—$Bi_2O_3$@$SiO_2$ nanocomposite material has an adsorption capacity for fuchsin of greater than or equal to 210 $mg \cdot g^{-1}$.

In some embodiments, the $Co_2O_3$@$Bi_2O_3SiO_2$ nanocomposite particles have an average diameter in a range from 12 to 25 nm.

In another exemplary embodiment, a method of producing the $Co_2O_3$—$Bi_2O_3$@$SiO_2$ nanocomposite material is described. The method includes sonicating bismuth nitrate pentahydrate in a nitric acid solution. The method includes adding water and stirring to form a first reaction mixture. The method further includes boiling cobalt nitrate hexahydrate in ammonia solution under stirring to form a second reaction mixture. The method further includes dispersing hydrophilic fumed silica and fructose powder in water using sonication and stirring to form a third reaction mixture. The method further includes adding the first reaction mixture and the second reaction mixture to the third reaction mixture and stirring at 190 degrees Celsius (° C.) until visible water is evaporated to form a solid. The method further includes drying the solid at 150° C. to form a dried solid. The method includes milling the dried solid to form a milled solid. The method includes calcining the milled solid at a temperature in a range from 400 to 500° C. for 4 to 6 hours (h) to form the $Co_2O_3$—$Bi_2O_3$@$SiO_2$ nanocomposite material.

In some embodiments, the concentration of bismuth nitrate pentahydrate in the first reaction mixture is in a range from 0.03 to 0.05 molar (M), and the concentration of nitric acid ($HNO_3$) in the first reaction mixture is in a range from 100 to 160 milliliters per liter (ml/L).

In some embodiments, the concentration of cobalt nitrate hexahydrate in the second reaction mixture is in a range from 0.03 to 0.05 M, and the concentration of ammonia in the second reaction mixture is in a range from 100 to 160 ml/L.

In some embodiments, the concentration of hydrophilic fumed silica in the third reaction mixture is in a range from 0.2 to 0.3 M, and the concentration of fructose powder in the third reaction mixture is in a range from 0.10 to 0.17 M.

In some embodiments, the milled solid is calcined at a temperature in a range from 425 to 475° C. for 5 h.

The foregoing general description of the illustrative embodiments and the following detailed description thereof are merely exemplary aspects of the teachings of this disclosure and are not restrictive.

BRIEF DESCRIPTION OF THE DRAWINGS

A more complete appreciation of this disclosure and many of the attendant advantages thereof will be readily obtained as the same becomes better understood by reference to the following detailed description when considered in connection with the accompanying drawings, wherein.

DETAILED DESCRIPTION

Figure 1:
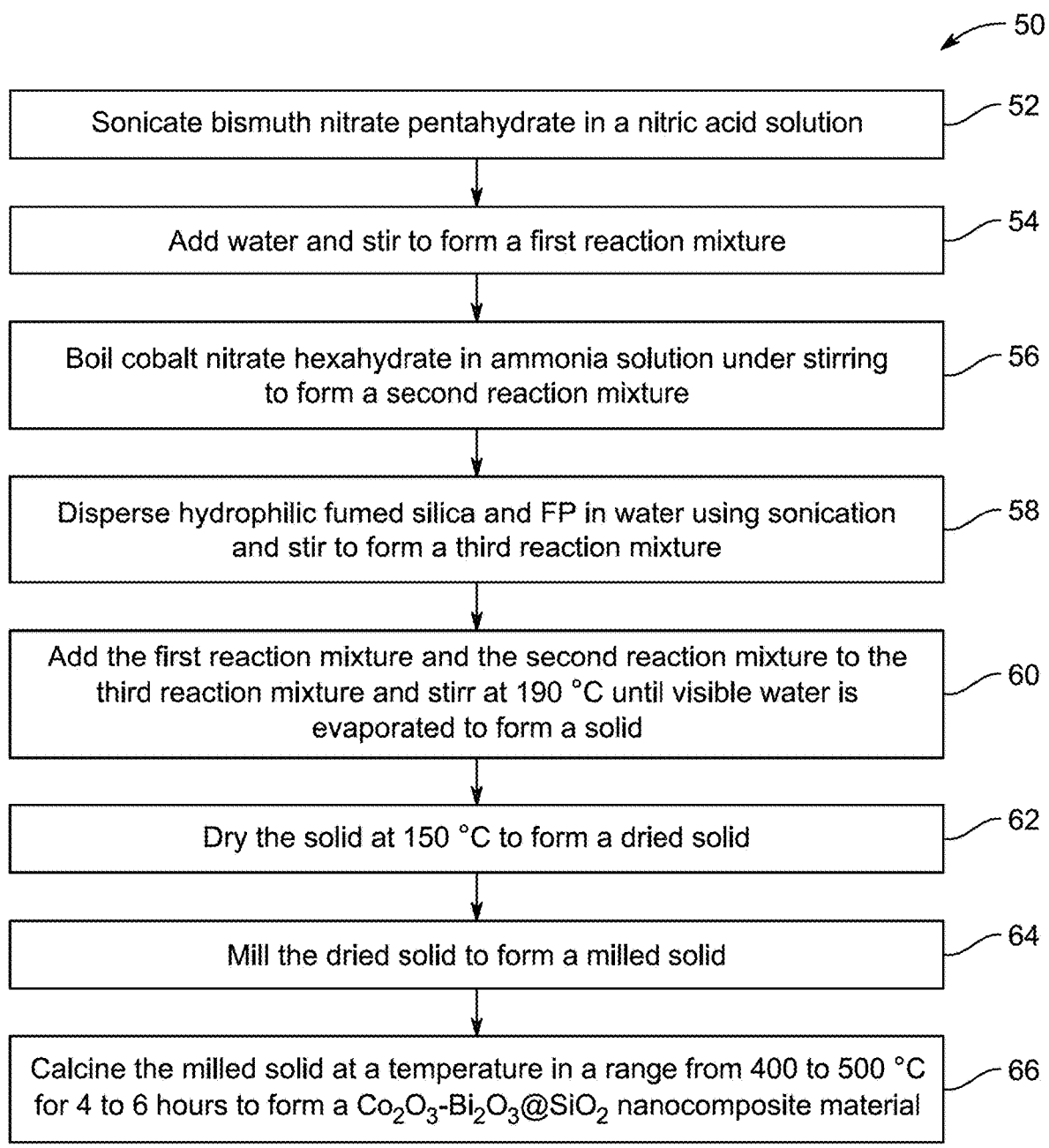
FIG. 1 is a schematic diagram of a flow chart of a method of manufacturing a nanocomposite ($Co_2O_3$—$Bi_2O_3$@$SiO_2$) including cobalt oxide ($Co_2O_3$), bismuth oxide ($Bi_2O_3$), and silicon dioxide ($SiO_2$), according to certain embodiments.

In the drawings, like reference numerals designate identical or corresponding parts throughout the several views. Further, as used herein, the words "a," "an" and the like generally carry a meaning of "one or more," unless stated otherwise.

Furthermore, the terms "approximately," "approximate," "about," and similar terms generally refer to ranges that include the identified value within a margin of 20%, 10%, or preferably 5%, and any values therebetween.

When describing the present disclosure, the terms used are to be construed in accordance with the following definitions, unless a context dictates otherwise.

Embodiments of the present disclosure will now be described more fully hereinafter with reference to the accompanying drawings wherever applicable, in that some, but not all, embodiments of the disclosure are shown.

In the drawings, like reference numerals designate identical or corresponding parts throughout the several views. Further, as used herein, the words 'a,' 'an' and the like generally carry a meaning of 'one or more,' unless stated otherwise.

Furthermore, the terms 'approximately,' 'approximate,' 'about,' and similar terms generally refer to ranges that include the identified value within a margin of 20%, 10%, or preferably 5%, and any values therebetween.

When amounts, concentrations, dimensions and other parameters are expressed in the form of a range, a preferable range, an upper limit value, a lower limit value or preferable upper and limit values, it should be understood that any ranges obtainable by combining any upper limit or preferable value with any lower limit or preferable value are also specifically disclosed, irrespective of whether the obtained ranges are clearly mentioned in the context.

As used herein, the term 'amount' refers to the level or concentration of one or more reactants, catalysts, or materials present in a reaction mixture.

As used herein, the term 'particle' refers to a small object that acts as a whole unit with regard to its transport and properties.

As used herein, the term 'nanocomposite' refers to a composite material in which at least one dimension of the component is in the nanometer size scale (<100 nm). The nanocomposites are thus poly-phase solid materials made up of two or more nanomaterials. The term includes all types of multiphase solid material in which one of the phases has one, two, or three dimensions of less than 100 nm, or structures having nanoscale repeat distances between the different phases that make up the material. The definition within the scope of the invention includes porous media, colloids, gels, copolymers, and solid combination of a bulk matrix and nanodimensional phase(s) differing in properties due to dissimilarities in structure and chemistry. The nanocomposites morphologies that are generally prepared include phase separated systems, intercalated systems, and exfoliated systems. The nanocomposites include ceramic matrix nanocomposites (CMNC), polymer matrix nanocomposites (PMNC), metal matrix nanocomposites (MMNC) or any combination thereof.

As used herein, the term 'nanoparticles (NPs)' refers to particles having a particle size of 1 nanometer (nm) to 500 nm within the scope of the present disclosure. The NPs may exist in various morphological shapes, such as nanotubes, nanowires, nanospheres, nanosheets, nanocrystals, nanorectangles, nanotriangles, nanopentagons, nanohexagons, nanoprisms, nanodisks, nanocubes, nanoribbons, nanoblocks, nanobeads, nanotoroids, nanodiscs, nanobarrels, nanogranules, nanowhiskers, nanoflakes, nanofoils, nanopowders, nanoboxes, nanostars, tetrapods, nanobelts, nanourchins, nanoflowers, etc., and mixtures thereof.

As used herein, the term 'room temperature' refers to a temperature range of '23 degrees Celsius (° C.)±2° C. in the present disclosure. As used herein, 'ambient conditions' means the temperature and pressure of the surroundings in which the substance, composition or article is located.

As used herein the term 'disposed' refers to being positioned, placed, deposited, arranged or distributed in a particular manner.

As used herein, the term 'X-ray diffraction' or 'XRD' or 'X-ray crystallography' refers to basic technique for obtaining information on the atomic structure of crystalline materials used as a standard laboratory technique. Unless otherwise specified, the XRD shall include an analytical technique based on the diffraction of X-rays by matter, including for crystalline materials.

As used herein, adsorption capacity refers to the amount of a compound that can be adsorbed in milligrams per gram of adsorbent used. It represents the amount of a particular compound adsorbed per given amount of adsorbent under certain conditions.

As used herein, the term 'Scanning Electron Microscopy' or 'SEM' refers to a surface-imaging technique that produces images of a sample by scanning the sample with a focused beam of electrons. Unless otherwise specified, the SEM shall include all imaging techniques using electron beams for imaging.

In this application, a numerical value interval (i.e., a numerical value range) is involved, and, if not specifically stated, an optional numerical value distribution is considered continuous within the numerical value interval, and includes two numerical value endpoints (i.e., minimum and maximum values) of the numerical value range, and each numerical value between the two numerical value endpoints.

The temperature parameters in the present application, if not specifically limited, are both allowed to be constant temperature processing and also allowed to be varied within a certain temperature interval. It should be understood that the constant temperature processing allows the temperature to fluctuate within the precision range of the instrument control. It is allowed to fluctuate in the range of, for example, 5° C., 4° C., 3° C., 2° C., 1° C.

A weight percent of a component, unless specifically stated to the contrary, is based on the total weight of the formulation or composition in which the component is included. For example, if a particular element or component in a composition or article is said to have 5 wt. %, it is understood that this percentage is in relation to a total compositional percentage of 100%.

In addition, the present disclosure is intended to include all isotopes of atoms occurring in the present compounds and complexes. Isotopes include those atoms having the same atomic number but different mass numbers.

Aspects of this disclosure pertain to a nanocomposite material of $Co_2O_3$—$Bi_2O_3$@$SiO_2$ fabricated for effective sorbent for water remediation.

A nanocomposite material of $Co_2O_3$—$Bi_2O_3$@$SiO_2$ is described. The $Co_2O_3$—$Bi_2O_3$@$SiO_2$ nanocomposite material includes $Co_2O_3$@$Bi_2O_3SiO_2$ nanocomposite particles which have a granular morphology with an average diameter in a range from 5 to 50 nm, preferably in the range of 10 to 30 nm, preferably in the range of 12 to 28 nm, preferably in the range of 12 to 25 nm, preferably in the range of 15 to 20 nm. In one or more embodiments, the $Co_2O_3$—$Bi_2O_3$@$SiO_2$ nanocomposite material has a measurable pore structure, in which pore volume, pore diameter, and surface area may be determined. The properties of pore volume, pore diameter, and surface area will determine the ability of the $Co_2O_3$—$Bi_2O_3$@$SiO_2$ nanocomposite material to adsorb contaminant compounds.

In one or more embodiments, the $Co_2O_3$—$Bi_2O_3$@$SiO_2$ nanocomposite material has a Brunauer-Emmett-Teller (BET) surface area of greater than or equal to 50 $m^2 \cdot g^{-1}$, preferably greater than or equal to 70 $m^2 \cdot g^{-1}$, preferably greater than or equal to 75 $m^2 \cdot g^{-1}$, preferably greater than or equal to 80 $m^2 \cdot g^{-1}$, more preferably about 82.51 $m^2 \cdot g^{-1}$. The BET hypothesis is the foundation for a analysis method for determining the specific surface area of a material. It attempts to explain the physical adsorption of gas molecules on a solid surface. Specific surface area is a property of solids, which is the total surface area of a material per unit of mass, solid or bulk volume, or cross-sectional area. In some embodiments, pore diameter, pore volume, and BET surface area are measured by gas adsorption analysis, preferably $N_2$ adsorption analysis (e.g., $N_2$ adsorption isotherms).

In some embodiments, the average pore distribution of the $Co_2O_3$—$Bi_2O_3$@$SiO_2$ nanocomposite material may include, but is not limited to, crystalline average pore distribution, bimodal, trimodal, multimodal, narrow, broad, and Gaussian. In a preferred embodiment, the average pore distribution of the $Co_2O_3$—$Bi_2O_3$@$SiO_2$ nanocomposite material is unimodal, indicating a single dominant pore size within the material. This unimodal distribution suggests that the nanohybrid possess a relatively narrow pore size range, resulting in more uniform pore structures and enhancing specific properties such as adsorption capacity, catalytic activity, or surface reactivity.

In some embodiments, an average pore diameter of the $Co_2O_3$—$Bi_2O_3$@$SiO_2$ nanocomposite material, according to Barrett-Joyner-Halenda (BJH) measurement method, is in a range of from 1 to 15 nm, preferably 4 to 10 nm, preferably 2 to 9 nm, preferably 3 to 9 nm, preferably 5 to 9 nm, preferably 5 to 8.5 nm, preferably 6.5 to 8 nm, preferably 7 to 8 nm. In a preferred embodiment, the $Co_2O_3$—$Bi_2O_3$@$SiO_2$ nanocomposite material has an average pore diameter of 7.24 nm.

In some embodiments, an average pore volume of the $Co_2O_3$—$Bi_2O_3$@$SiO_2$ nanocomposite material, according to the BJH measurement method, is greater than or equal to 0.040 $cm^3 \cdot g^{-1}$, preferably greater than or equal to 0.060 $cm^3 \cdot g^{-1}$, preferably greater than or equal to 0.070 $cm^3 \cdot g^{-1}$, preferably greater than or equal to 0.080 $cm^3 \cdot g^{-1}$. In a preferred embodiment, the $Co_2O_3$—$Bi_2O_3$@$SiO_2$ nanocomposite material has an average pore volume of 0.081 $cm^3/g$.

In one or more embodiments, the $Co_2O_3$—$Bi_2O_3$@$SiO_2$ nanocomposite material includes oxygen in a range from 30 to 70 wt. %, Co in a range from 5 to 30 wt. %, Bi in a range from 5 to 30 wt. %, and Si in a range from 5 to 40 wt. % compared to the total weight of the $Co_2O_3$—$Bi_2O_3$@$SiO_2$ nanocomposite material.

The $Co_2O_3$—$Bi_2O_3$@$SiO_2$ nanocomposite material can be used as an effective sorbent for water remediation. In some embodiments, the nanocomposite material can be used to remove organic contaminants including pesticides, pharmaceuticals, dyes, and other synthetic or natural organic substances that can pose environmental or health risks.

In some embodiments, the organic contaminant may be a dye, a phenol, a polycyclic aromatic hydrocarbon, an herbicide, a pesticide, a persistent organic contaminant, or the like.

In alternate embodiments, the organic contaminant is a dye. A dye is a colored substance that chemically binds to a material it may be intended to color. Generally, a dye is applied in solution, typically aqueous solution. Examples of dyes include, but are not limited to: acridine dyes, which are acridine and its derivatives such as acridine orange, acridine yellow, acriflavine, and gelgreen; anthraquinone dyes, which are anthroaquinone and its derivatives such as acid blue 25, alizarin, anthrapurpurin, carminic acid, 1,4-diamno-2,3-dihydroanthraquinone, 7,14-dibenzypyrenequinone, dibromoanthrone, 1,3-dihydroxyanthraquinone, 1,4-dihydroxyanthraquinone, disperse red 9, disperse red 11, indanthrone blue, morindone, oil blue 35, parietin, quinizarine green SS, remazol brilliant blue R, solvent violet 13, 1,2,4-trihydroxyanthraquinone, vat orange 1, and vat yellow 1; diaryl methane dyes such as auramine O, triarylmethane dyes such as acid fuchsin, aluminon, aniline blue WS, aurin, aurintricarboxylic acid, brilliant blue FCF, brilliant green, bromocresol green, bromocresol purple, bromocresol blue, bromophenol blue, bromopyrogallol red, chlorophenol red, coomassie brilliant blue, cresol red, O-cresolphthalein, crystal violet, dichlorofluorescein, ethyl green, fast green FCT, FlAsH-EDT2, fluoran, fuchsine, green S, light green SF, malachite green, merbromin, metacresol purple, methyl blue, methyl violet, naphtholphthalein, new fuchsine, pararosaniline, patent blue V, phenol red, phenolphthalein, phthalein dye, pittacal, spirit blue, thymol blue, thymolphthalein, Victoria blue BO, Victoria blue R, water blue, xylene cyanol, and xylenol orange; azo dyes such as acid orange 5, acid red 13, alican yellow, alizarine yellow R, allura red AC, amaranth, amido black 10B, aniline yellow, arylide yellow, azo violet, azorubine, basic red 18, biebrich scarlet, Bismarck brown Y, black 7984, brilliant black BN, brown FK, chrysoine resorcinol, citrus red 2, congo red, D&C red 33, direct blue 1, disperse orange 1, eriochrome black T, evans blue, fast yellow AB, orange 1, hydroxynaphthol blue, janus green B, lithol rubine BK, metanil yellow, methyl orange, methyl red, methyl yellow, mordant brown 33, mordant red 19, naphthol AS, oil red 0, oil yellow DE, orange B, orange G, orange GGN, para red, pigment yellow 10, ponceau 2R, prontosil, red 2G, scarlet GN, Sirius red, solvent red 26, solvent yellow 124, sudan black B, sudan I, sudan red 7B, sudan stain, tartrazine, tropaeolin, trypan blue, and yellow 2G; phthalocyanine dyes such as phthalocyanine blue BN, phthalocyanine Green G, Alcian blue, and naphthalocyanine, azin dyes such as basic black 2, mauveine, neutral red, Perkin's mauve, phenazine, and safranin; indophenol dyes such as indophenol and dichlorophenolindophenol; oxazin dyes; oxazone dyes; thiazine dyes such as azure A, methylene blue, methylene green, new methylene blue, and toluidine blue; thiazole dyes such as primuline, stains-all, and thioflavin; xanthene dyes such as 6-carboxyfluorescein, eosin B, eosin Y, erythosine, fluorescein, rhodamine B, rose bengal, and Texas red; fluorone dyes such as calcein, carboxyfluorescein diacetate succinimidyl ester, fluo-3, fluo-4, indian yellow, merbromin, pacific blue, phloxine, and seminaphtharhodafluor; or rhodamine dyes such as rhodamine, rhodamine 6G, rhodamine 123, rhodamine B, sulforhodamine 101, and sulforhodamine B.

A phenol is an organic compound including of a hydroxyl group (—OH) bonded directly to an aromatic hydrocarbon group. Examples of phenols include, but are not limited to, phenol (the namesake of the group of compounds), bisphenols (including bisphenol A), butylated hydroxytoluene (BHT), 4-nonylphenol, orthophenyl phenol, picric acid, phenolphthalein and its derivatives mentioned above, xylenol, diethylstilbestrol, L-DOPA, propofol, butylated hydroxyanisole, 4-tert-butylcatechol, tert-butylhydroquinone, carvacrol, chloroxyleol, cresol (including M-, O-, and P-cresol), 2,6-di-tert-butylphenol, 2,4-dimethyl-6-tert-butylphenol, 2-ethyl-4,5-dimethylphenol, 4-ethylguaiacol, 3-ethylphenol, 4-ethylphenol, flexirubin, mesitol, 1-nonyl-4-phenol, thymol, 2,4,6-tri-tert-butylphenol, chlorophenol (including 2-, 3-, and 4-chlorophenol), dichlorophenol (including 2,4- and 2,6-dichlorophenol), bromophenol, dibromophenol (including 2,4-dibromophenol), nitrophenol, norstictic acid, oxybenzone, and paracetamol (also known as acetoaminophen).

A polycyclic aromatic hydrocarbon (PAH) is an aromatic hydrocarbon composed of multiple aromatic rings. Examples of polycyclic aromatic hydrocarbons include naphthalene, anthracene, phenanthrene, phenalene, tetracene, chrysene, triphenylene, pyrene, pentacene, benzo[a]pyrene, corannulene, benzo[g,h,i]perylene, coronene, ovalene, benzo[c]fluorine, acenaphthene, acenaphthylene, benz[a]anthracene, benzo[b]fluoranthene, benzo[j]fluoranthene, benzo[k]fluoranthene, benzo[e]pyrene, cyclopenta[c,d]pyrene, dibenz[a,h]anthracene, dibenzo[a,e]pyrene, dibenzo[a,h]pyrene, dibenzo[a,i]pyrene, dibenzo[a,l]pyrene, fluoranthene, fluorine, indeno[1,2,3-c,d]pyrene, 5-methylchrysene, naphthacene, pentaphene, picene, and biphenylene.

An herbicide (also known as "weedkiller") is a substance that is toxic to plants and may kill, inhibit the growth of, or prevent the germination of plants. Herbicides are typically used to control the growth of or remove unwanted plants from an area of land, particularly in an agricultural context. Examples of herbicides include, but are not limited to, 2,4-D, aminopyralid, chlorsulfuron, clopyralid, dicamba, diuron, glyphosate, hexazinone, imazapic, imazapyr, methsulfuron methyl, picloram, sulfometuron methyl, triclopyr, fenoxaprop, fluazifop, quizalofop, clethodim, sethoxydim, chlorimuron, foramsulfuron, halosulfuron, nicosulfuron, primisulfuron, prosulfuron, rimsulfuron, thofensulfuron, tribenuron, imazamox, imazaquin, flumetsulam, cloransulam, thiencarbazone, fluoxpyr, diflufenzopyr, atrazine, simazine, metribuzin, bromoxynil, bentazon, linuron, glufosinate, clomazone, isoxaflutole, topramezone, mesotrione, tembotrione, acifluorfen, formesafen, lactofen, flumiclorac, flumioxazin, fulfentrazone, carfentrazone, fluthiacet-ethyl, falufenacil, paraquat, ethalfluralin, pendimethalin, trifluralin, butylate, EPTC, ecetochlor, alachlor, metolachlor, dimethenamid, flufenacet, and pyroxasulfone.

A pesticide is a substance meant to prevent, destroy, or control pests including, but not limited to algae, bacteria, fungi, plants, insects, mites, snails, rodents, and viruses.

A pesticide intended for use against algae is known as an algicide. Examples of algicides include benzalkonium chloride, bethoxazin, cybutryne, dichlone, dichlorophen, diuron, endothal, fentin, isoproturon, methabenthiazuron, nabam, oxyfluorfen, pentachlorophenyl laurate, quinoclamine, quinonamid, simazine, terbutryn, and tiodonium.

A pesticide intended for use against bacteria is known as a bactericide. Examples of bactericides include antibiotics such as: aminoglycosides such as amikacin, gentamicin, kanamycin, neomycin, netilmicin, tobramycin, paromomycin, streptomycin, and spectinomycin; ansamycins such as geldanamycin, herbimycin, and rifaximin; carbacephems such as loracarbef; carbapenems such as ertapenem, doripenem, imipenem, and meropenem; cephalosporins such as cefadroxil, cefazolin, cephradine, cephapirin, cephalothin, cephalexin, cefaclor, cefoxitin, cefotetan, cefamandole, cefmetazole, cefonicid, cefprozil, cefuroxime, cefixime, cefdinir, cefditoren, cefoperazone, cefotaxime, cefpodoxime, cefazidime, ceftibuten, ceftizoxime, moxalactam, ceftriaxone, cefepime, cefaroline fosamil, and ceftobiprole; glycopeptides such as teicoplanin, vancomycin, telavancin, dalbavancin, and oritavancin; lincosamides such as clindamycin and lincomycin; lipopeptides such as daptomycin; macrolides such as azithromycin, clarithromycin, erythromycin, roxithromycin, telithromycin, spiramycin, and fidoxamicin; monobactams such as aztreonam; nitrofurans such as furazolidone and nitrofurantoin; oxazolidinones such as linezolid, posizolid, radezolid, and torezolid; penicillins such as amoxicillin, ampicillin, azlocillin, dicloxacillin, flucloxacillin, mezlocillin, methicillin, nafcillin, oxacillin, penicillins (including penicillin G and V), piperacillin, temocillin, and ticarcillin; polypeptides such as bacitracin, colistin, and polymyxin B; quinolones such as ciprofloxacin, enoxacin, gatifloxacin, gemifloxacin, levofloxacin, lomefloxacin, moxifloxacin, nadifloxacin, nalidixic acid, norfloxacin, ofloxacin, trovafloxacin, gepafloxacin, sparfloxacin, and temafloxacin; sulfonamides such as mafenide, sulfacetamide, sulfadiazine, sulfadithoxine, sulfamethizole, sulfamethoxazole, sulfanilamide, sulfasalazine, sulfisoxazole, and sulfonamidochrysoidine; tetracyclines such as demeclocycline, doxycycline, metacycline, minocycline, oxytetracycline, and tetracycline.

A pesticide intended for use against fungi is known as a fungicide. Examples of fungicides include acibenzolar, acypetacs, aldimorph, anilazine, aureofungin, azaconazole, azithiram, azoxystrobin, benalaxyl, benodanil, benomyl, benquinox, benthiavalicarb, binapacryl, biphenyl, bitertanol, bixafen, blasticidin-S, boscalid, bromuconazole, captafol, captan, carbendazim, carboxin, carpropamid, chloroneb, chlorothalonil, chlozolinate, cyazofamid, cymoxanil, cyprodinil, dichlofluanid, diclocymet, dicloran, diethofencarb, difenoconazole, diflumetorim, dimethachlone, dimethomorph, diniconazole, dinocap, dodemorph, edifenphos, enoxastrobin, epoxiconazole, etaconazole, ethaboxam, ethirimol, etridiazole, famoxadone, fenamidone, fenarimol, fenbuconazole, fenfuram, fenhexamid, fenoxanil, fenpropidin, fenpropimorph, ferbam, fluazinam, fludioxonil, flumorph, fluopicolide, fluopyram, fluoroimide, fluoxastrobin, flusilazole, flutianil, flutolain, flopet, fthalide, furalaxyl, guazatine, hexaconazole, hymexazole, imazalil, imibenconazole, iminoctadine, iodocarb, ipconazole, iprobenfos, iprodione, iprovalicarb, siofetamid, isoprothiolane, isotianil, kasugamycin, laminarin, mancozeb, mandestrobin, mandipropamid, maneb, mepanypyrim, mepronil, meptyldinocap, mealaxyl, metominostrobin, metconazole, methafulfocarb, metiram, metrafenone, myclobutanil, naftifine, nuarimol, octhilinone, ofurace, orysastrobin, oxadixyl, oxathiapiprolin, oxolinic acid, oxpoconazole, oxycarboxin, oxytetracycline, pefurazate, penconazole, pencycuron, penflufen, penthiopyrad, phenamacril, picarbutrazox, picoxystrobin, piperalin, polyoxin, probenzole, prochloraz, procymidone, propamocarb, propiconazole, propineb, proquinazid, prothiocarb, prothioconazole, pydiflumetofen, pyraclostrobin, pyrametostrobin, pyraoxystrobin, pyrazophos, pyribencarb, pyributicarb, pyrifenox, pyrimethanil, pyrimorph, pyriofenone, pyroquilon, quinoxyfen, quintozene, sedaxane, silthiofam, simeconazole, spiroxamine, streptomycin, tebuconazole, tebufloquin, teclofthalam, tecnazene, terbinafine, tetraconazole, thiabendazole, thifluzamide, thiphanate, thiram, tiadinil, tolclosfos-methyl, folfenpyrid, tolprocarb, tolylfluanid, triadimefon, triadimenol, triazoxide, triclopyricarb, tricyclazole, tridemorph, trifloxystrobin, triflumizole, triforine, validamycin, and vinclozolin.

A pesticide intended for use against plants is known as an herbicide as described above.

A pesticide intended for use against insects is known as an insecticide. Examples of insecticides are: organochlorides such as Aldrin, chlordane, chlordecone, DDT, dieldrin, endofulfan, endrin, heptachlor, hexachlorobenzene, lindane, methoxychlor, mirex, pentachlorophenol, and TDE; organophosphates such as acephate, azinphos-methyl, bensulide, chlorethoxyfos, chlorpyrifos, diazinon, chlorvos, dicrotophos, dimethoate, disulfoton, ethoprop, fenamiphos, fenitrothion, fenthion, malathion, methamdophos, methidathion, mevinphos, monocrotophos, naled, omethoate, oxydemeton-methyl, parathion, phorate, phosalone, phosmet, phostebupirim, phoxim, pirimiphos-methyl, profenofos, terbufos, and trichlorfon; carbamates such as aldicarb, bendiocarb, carbofuran, carbaryl, dioxacarb, fenobucarb, fenoxycarb, isoprocarb, methomyl; pyrethroids such as allethrin, bifenthrin, cyhalothrin, cypermethrin, cyfluthrin, deltamethrin, etofenprox, fenvalerate, permethrin, phenothrin, prallethrin, resmethrin, tetramethrin, tralomethrin, and transfluthrin; neonicotinoids such as acetamiprid, clothiandin, imidacloprid, nithiazine, thiacloprid, and thiamethoxam; ryanoids such as chlorantraniliprole, cyanthaniliprole, and flubendiamide.

A pesticide intended for use against mites is known as a miticide. Examples of miticides are permethrin, ivermectin, carbamate insecticides as described above, organophosphate insecticides as described above, dicofol, abamectin, chlorfenapyr, cypermethrin, etoxazole, hexythiazox, imidacloprid, propargite, and spirotetramat.

A pesticide intended for use against snails and other mollusks is known as a molluscicide. Examples of molluscicides are metaldehyde and methiocarb.

A pesticide intended for use against rodents is known as a rodenticide. Examples of rodenticides are warfarin, coumatetralyl, difenacoum, brodifacoum, flocoumafen, bromadiolone, diphacinone, chlorophacinone, pindone, difethialone, cholecalciferol, ergocalciferol, ANTU, chloralose, crimidine, 1,3-difluoro-2-propanol, endrin, fluroacetamide, phosacetim, pyrinuron, scilliroside, strychnine, tetramethylenedisulfotetramine, bromethalin, 2,4-dinitrophenol, and uragan D2.

A pesticide intended for use against viruses is known as a virucide. Examples of virucides are cyanovirin-N, griffithsin, interferon, NVC-422, scytovirin, urumin, virkon, zonroz, and V-bind viricie.

A persistent organic contaminant is a toxic organic chemical that adversely affects human and environmental health, can be transported by wind and water, and can persist for years, decades, or centuries owing to resistance to environmental degradation by natural chemical, biological, or photolytic processes. Persistent organic contaminants are regulated by the United Nations Environment Programme 2001 Stockholm Convention on Persistent Organic Contaminants. Examples of persistent organic contaminants are Aldrin, chlordane, dieldrin, endrin, heptachlor, hexachlorobenzene, mirex, toxaphene, polychlorinated biphenyl (PCBs), dichlorodiphenyltrichloroethane (DDT), dioxins, polychlorinated dibenzofurans, chlordecone, hexachlorocyclohexane (α- and β-), hexabromodiphenyl ether, lindane, pentachlorobenzene, tetrabromodiphenyl ether, perfluorooctanesulfonic acid, endosulfans, and hexabromocyclododecane.

In an embodiment, the organic contaminant is at least one of indigo carmine, fuchsin, ciproflaxin, and/or combinations thereof. In one specific embodiment, the $Co_2O_3$—

$Bi_2O_3$@$SiO_2$ nanocomposite material has an adsorption capacity for ciproflaxin of greater than or equal to 50 mg·g$^{-1}$, preferably greater than or equal to 70 mg·g$^{-1}$, preferably greater than or equal to 75 mg·g$^{-1}$, more preferably 79.3 mg·g$^{-1}$ at a temperature range of 35 to 50° C., preferably 40 to 50° C., preferably 45 to 50° C., preferably 50° C.

In another specific embodiment, the $Co_2O_3$—$Bi_2O_3$@$SiO_2$ nanocomposite material has an adsorption capacity for indigo carmine of greater than or equal to 50 mg·g$^{-1}$, preferably greater than or equal to 75 mg·g$^{-1}$, preferably greater than or equal to 80 mg·g$^{-1}$, preferably about 89.1 mg·g$^{-1}$ at a temperature range of 35 to 50° C., preferably 40 to 50° C., preferably 45 to 50° C., preferably 50° C.

In another specific embodiment, the $Co_2O_3$—$Bi_2O_3$@$SiO_2$ nanocomposite material has an adsorption capacity for fuchsin of greater than or equal to 150 mg·g$^{-1}$, preferably greater than or equal to 190 mg·g$^{-1}$, preferably greater than or equal to 210 mg·g$^{-1}$, preferably about 220.4 mg·g$^{-1}$ at a temperature range of 35 to 50° C., preferably 40 to 50° C., preferably 45 to 50° C., preferably 50° C.

FIG. 1 illustrates a schematic flow chart of a method 50 of producing the $Co_2O_3$—$Bi_2O_3$@$SiO_2$ nanocomposite material. The order in which the method 50 is described is not intended to be construed as a limitation, and any number of the described method steps can be combined to implement the method 50. Additionally, individual steps may be removed or skipped from the method 50 without departing from the spirit and scope of the present disclosure.

At step 52, the method 50 includes sonicating bismuth nitrate pentahydrate in a nitric acid solution. Sonicating bismuth nitrate pentahydrate ($Bi(NO_3)_3$·$5H_2O$) in a nitric acid ($HNO_3$) solution helps with dissolution and dispersion. In some embodiments, other bismuth sources, like bismuth hydroxide, bismuth chloride, bismuth carbonate, bismuth carbonate, etc., may be used as well. In some embodiments, the concentration of bismuth nitrate pentahydrate is about 5 to 20 mM, preferably 6 to 18 mM, preferably 8 to 15 mM, preferably 9 to 12 mM, preferably about 10 mM.

In an embodiment, the concentration of nitric acid is about 50%, preferably 60%, preferably 5%, preferably 70%, preferably 75%, preferably 80%, preferably 85%, preferably 90%, preferably 95%; however, its most preferred to use 70% nitric acid. In some embodiments, other acids, such as sulfuric acid, acetic acid, hydrochloric acid, may be used as well.

In an embodiment, the concentration of bismuth nitrate pentahydrate in the first reaction mixture is in a range from 0.01 to 0.1M, preferably 0.03 to 0.05 M, and the concentration of nitric acid in the first reaction mixture is in a range from 50 to 250 ml/L, preferably 100 to 160 ml/L.

At step 54, the method 50 includes adding water and stirring to form a first reaction mixture. Water is generally added to control the concentration and hydrolysis rate of $Bi^{3+}$ ions. Also, it is preferred to add water slowly, as adding water too quickly can lead to precipitation of $BiONO_3$, an unwanted intermediate.

At step 56, the method 50 includes boiling cobalt nitrate hexahydrate in ammonia solution under stirring to form a second reaction mixture. Cobalt nitrate hexahydrate is a source for preparing $Co_2O_3$ in the $Co_2O_3$—$Bi_2O_3$@$SiO_2$ nanocomposite. In some embodiments, other sources, such as cobalt hydroxide, cobalt sulfate, cobalt chloride, cobalt oxide, etc., may also be used to prepare the second reaction mixture. In one embodiment, the concentration of cobalt nitrate hexahydrate in the second reaction mixture is in a range from 0.01 to 0.1M, preferably 0.03 to 0.05 M. In another embodiment, the concentration of ammonia in the second reaction mixture is in the range of 50 to 250 ml/L, preferably 100 to 160 ml/L.

At step 58, the method 50 includes dispersing hydrophilic fumed silica and fructose powder in water using sonication and stirring to form a third reaction mixture. Hydrophilic fumed silica is a highly porous and finely powdered silica ($SiO_2$) material and used to form the silica component in the $Co_2O_3$—$Bi_2O_3$@$SiO_2$ nanocomposite. The hydrophilic fumed silica and fructose powder are dispersed in water, preferably de-ionized water or distilled water, to avoid impurities. In an embodiment, the concentration of hydrophilic fumed silica in the third reaction mixture is in a range from 0.2 to 0.3 M, and the concentration of fructose powder in the third reaction mixture is in a range from 0.10 to 0.17 M.

The hydrophilic fumed silica and fructose powder is preferably sonicated, preferably using an ultrasonic probe, to break down agglomerates of silica and fructose powder particles, allowing them to disperse more evenly in the water. Typically, sonication for 1-5 minutes is sufficient to break up aggregates, but longer sonication may be needed for more stubborn agglomerates. In some embodiments, suitable surfactants like polyvinyl alcohol, triton-X, or sodium dodecyl sulfate, etc., may be used to reduce surface tension and improve the overall stability of the dispersion.

At step 60, the method 50 includes adding the first reaction mixture and the second reaction mixture to the third reaction mixture and stirring at 190° C. until visible water is evaporated to form a solid.

At step 62, the method 50 includes drying the solid at 150° C. to form a dried solid. The solid may be dried by using heating appliances such as ovens, vacuum ovens, microwaves, autoclaves, hot plates, heating mantles and tapes, oil baths, salt baths, sand baths, air baths, hot-tube furnaces, and hot-air guns. In a preferred embodiment, the solid may be dried in an oven.

At step 64, the method 50 includes milling the dried solid to form a milled solid. In some embodiments, the dried solid can be milled/ground using manual grinding methods such as mortar and pestle, hand-held grinders, and manual ball mills, and mechanical methods such as jet milling, vibratory milling, hammer milling, planetary milling, cryogenic grinding, or any other apparatus known to those of ordinary skill in the art. The purpose of milling the dried solid is to reduce its particle size. In an embodiment, the milling process is carried out for 10 to 30 minutes, preferably 15 to 25 minutes, preferably 20 minutes at 300 to 800 rpm, preferably 400 to 700 rpm, preferably 500 to 600 rpm, preferably 600 rpm using steel balls, preferably stainless steel balls of 1 centimeter (cm) diameter.

At step 66, the method 50 includes calcining the milled solid at a temperature in a range from 400 to 500° C., preferably 425 to 475° C., preferably 450° C. for 4 to 6 hours, preferably 5 hours, to form the $Co_2O_3$—$Bi_2O_3$@$SiO_2$ nanocomposite material. The calcination is carried out by heating it to a high temperature under a restricted supply of ambient oxygen. This is performed to remove impurities or volatile substances and to incur thermal decomposition. Typically, the calcination is carried out in a furnace, preferably equipped with a temperature control system, which may provide a heating rate of up to 50 degrees Celsius/minute (° C./min), preferably up to 40° C./min, preferably up to 30° C./min, preferably up to 20° C./min, preferably up to 10° C./min, preferably up to 3 to 5° C./min. In some embodiments, the calcination process occurs with a ramping temperature of 3-5° C./min at a temperature range of 450° C. for 5 h.

A method of immobilizing inorganic contaminants disposed in an aqueous medium is described. The method included contacting the aqueous medium with the particulate nanocomposite material.

It is understood that the nanocomposite immobilized contaminants including pollutants, radioactive nuclides, toxic metals, nutrients, salts, PTEs, heavy metals, metalloids, water contaminants, soil contaminants, chemicals, food and pharmaceutical adulterations.

In some embodiments, the method 50 includes immobilizing inorganic contaminants for the purpose of wastewater treatment, sewage treatment, or water treatment used for drinking. In some embodiments, the method 50 includes immobilizing the non-biodegradable synthetic chemicals for pollution control and environmental pollution remediation.

In some embodiments, the method 50 includes immobilizing a combination of inorganic and organic contaminants present in an aqueous medium. In some embodiments, the nanocomposite material of method 50 acts as nanocatalysts, nanosorbents, and/or nanosensors for the contaminants, enabling water disinfection, contaminant and pollutant immobilization, sensing and detection.

The following examples are provided solely for illustration and are not to be construed as limitations of the present disclosure, as many variations thereof are possible without departing from the spirit and scope of the present disclosure.

EXAMPLES

The following examples demonstrate a method of fabricating a nanocomposite including cobalt oxide ($Co_2O_3$), bismuth oxide ($Bi_2O_3$), and silicon dioxide ($SiO_2$) $Co_2O_3$—$Bi_2O_3$@$SiO_2$. The examples are provided solely for illustration and are not to be construed as limitations of the present disclosure, as many variations thereof are possible without departing from the spirit and scope of the present disclosure.

Example 1: Fabricating $Co_2O_3$—$Bi_2O_3$@$SiO_2$ Nanocomposite

According to the present disclosure, 10 millimole (mmol) of bismuth nitrate pentahydrate ($Bi(NO_3)_3 \cdot 5H_2O$) was transferred to a 500 milliliter (mL) beaker, and 30 mL of nitric acid (70%) was added to the beaker. The beaker contents were sonicated in an ultrasonic bath and then transferred to a hotplate stirrer, followed by the addition of 200 mL of distilled water, the beaker was marked as beaker 1. After that 10 mmol of cobalt nitrate hexahydrate was transferred to a 500 mL beaker. 200 mL of distilled water, followed by 30 mL of ammonia solution (32%), was added with continuous stirring on a hotplate stirrer and boiled for 1.0 hour (h) and the beaker was marked as beaker 2. Further, 80 mmol of hydrophilic fumed silica (HFS, $SiO_2$) and 40 mmol of fructose powder were added to a 1.0-liter (L) beaker and dispersed in 300 mL of water with the aid of ultrasonication for 20 minutes (min), followed by stirring. At the end the contents of Beaker-1 and Beaker-2 were added to the silica-bismuth mixture, and the resulting triple-ion mixture was heated to 190 degrees Celsius (° C.) until it was nearly dry. The beaker was then placed in an oven set to 150° C. for 6 h. The produced powder was collected, divided into two stainless steel ball-milling crucibles, each containing four stainless steel balls (1 centimeter (cm) diameter), and milled for 20 min at 600 rounds per minute (rpm). The powder was then transferred to a 150 mL porcelain dish and calcined at 450° C. for 5 h.

Example 2: Characterization of $Co_2O_3$—$Bi_2O_3$@$SiO_2$ Nanocomposites

Scanning electron microscopy (SEM) was employed to examine the morphology and particle size of the $Co_2O_3$—$Bi_2O_3$@$SiO_2$ nanocomposites, the elemental composition of the nanocomposite was determined using energy-dispersive X-ray (EDX) spectroscopy. Nitrogen ($N_2$) adsorption isotherm obtained by Brünauer-Emmett-Teller (BET) analyzer was used to calculate the surface characteristics, specifically the BET surface area, average pore diameter and average pore volume of the $Co_2O_3$—$Bi_2O_3$@$SiO_2$ nanocomposite.

Figure 2:
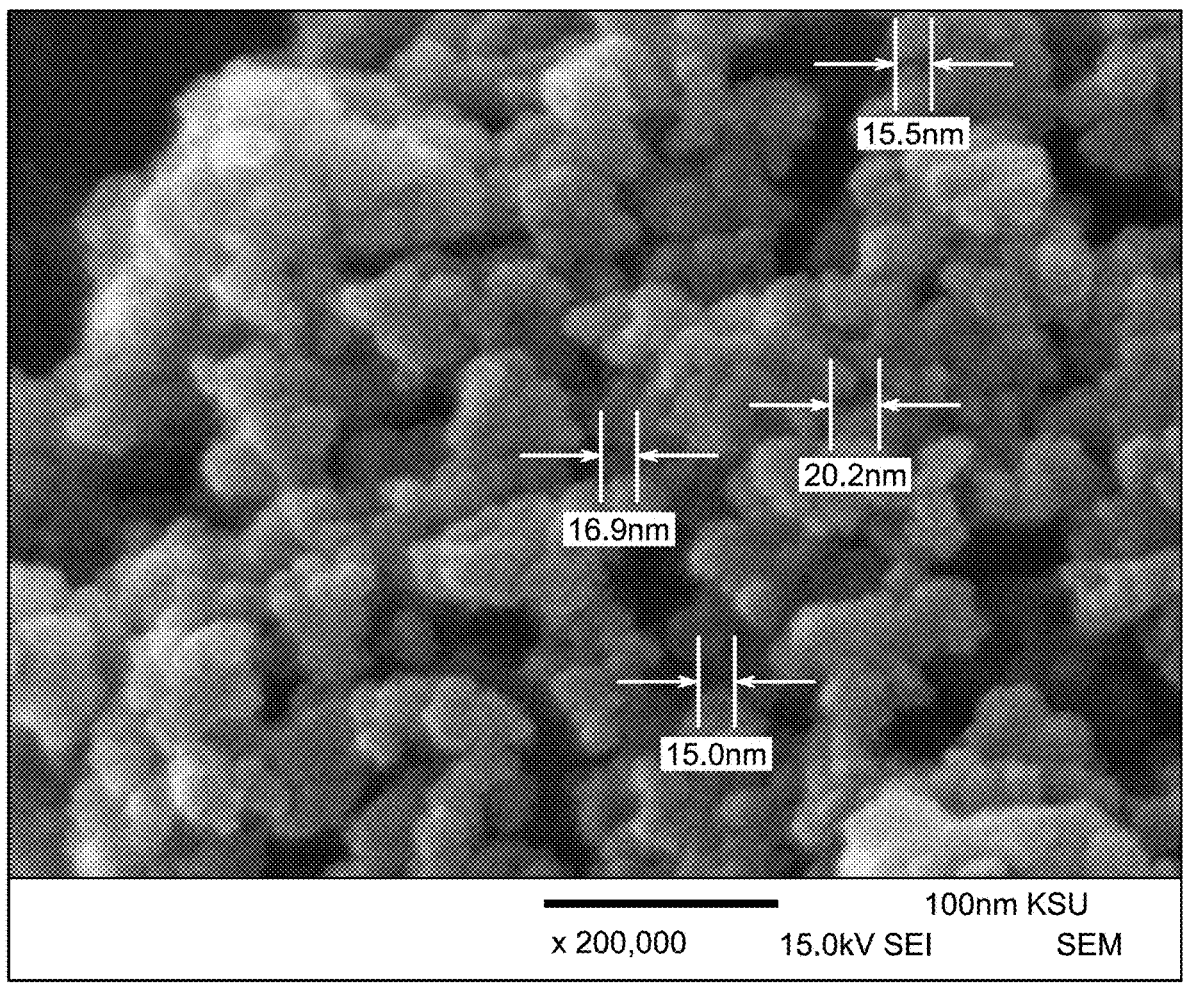
FIG. 2 depicts scanning electron microscopy (SEM) results for the $Co_2O_3$—$Bi_2O_3$@$SiO_2$ nanocomposite, according to certain embodiments.

As mentioned above, the morphology of the prepared nanocomposite was examined by SEM. FIG. 2 revealed that the particle size ranges from 15.0-20.0 nanometers (nm). These results implied that the fructose powder served as a disunity agent that downsized the $Co_2O_3$—$Bi_2O_3$@$SiO_2$ particles in the composites.

Figure 3:
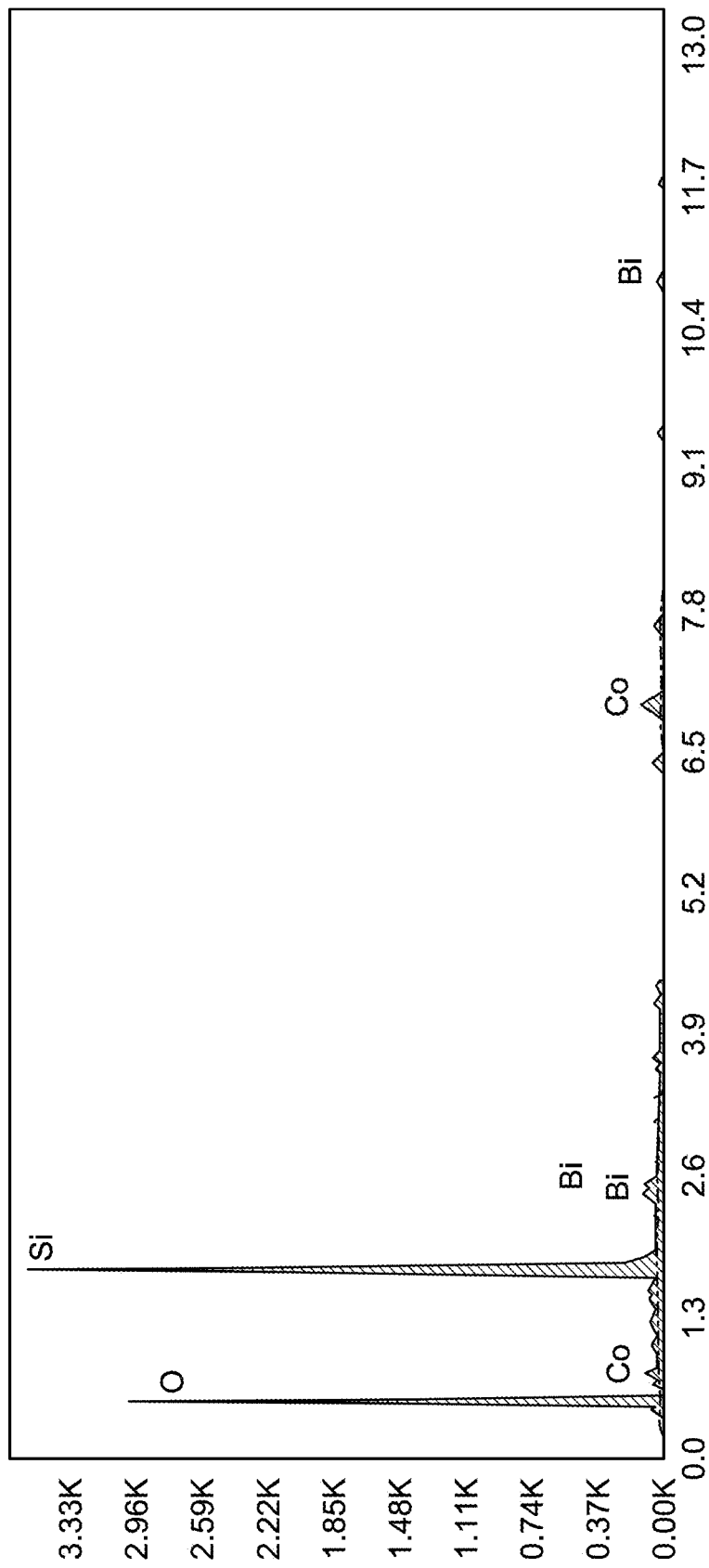
FIG. 3 is a graph depicting an energy dispersive x-ray (EDX) spectrum of the $Co_2O_3$—$Bi_2O_3$@$SiO_2$ nanocomposite, according to certain embodiments.

Further, the EDX spectrum of the prepared $Co_2O_3$—$Bi_2O_3$@$SiO_2$ nanocomposite is shown in FIG. 3 that demonstrated no foreign peak in the nanocomposite, indicating the $Co_2O_3$—$Bi_2O_3$@$SiO_2$ nanocomposite was pure.

Figure 4:
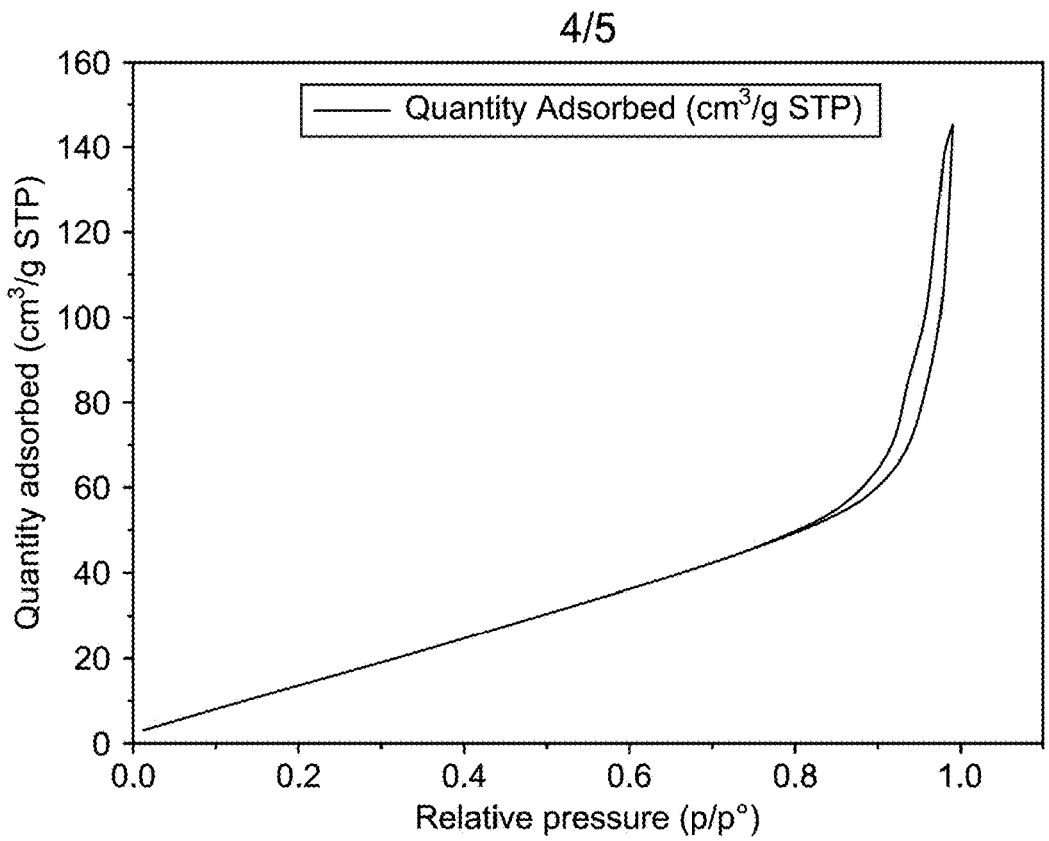
FIG. 4 is a graph depicting $N_2$ adsorption-desorption spectrum of the $Co_2O_3$—$Bi_2O_3$@$SiO_2$ nanocomposite, according to certain embodiments.

According to the present disclosure, FIG. 4 shows the nitrogen adsorption-desorption isotherms of $Co_2O_3$—$Bi_2O_3$@$SiO_2$ nanocomposite. The nitrogen sorption isotherm of the composite belongs to type IV with a clear hysteresis loop, indicating the formation of mesoporous structures. However, shifting the loop to a relatively lower pressure ($P/P_0$=0.59-1) suggests a decrease in the size of the mesopores, which may result from the deposition of metal oxide particles in the pores of $SiO_2$. Furthermore, the BET surface area of the $Co_2O_3$—$Bi_2O_3$@$SiO_2$ sample was calculated to be 82.51 square meters per gram ($m^2 \, g^{-1}$). The marked high specific surface area reflects the good dispersion of these metal oxide nanoparticles on $SiO_2$. Moreover, the pore size distribution curve presented in FIG. 5 was plotted using the (Barrett-Joyner-Halenda) BJH method, the $Co_2O_3$—$Bi_2O_3$@$SiO_2$ nanocomposite exhibited unimodal distribution with average pore diameters maximized at 7.24 nm and pore volume of 0.081 cubic centimeters per gram ($cm^3 \, g^{-1}$). All the isotherms belong to the category H3 type of pores, which do not exhibit limiting adsorption at high $P/P_0$ and arises due to aggregation of plate-like particles, giving rise to slit-shaped pores, indicating a mesoporous array.

Figure 5:
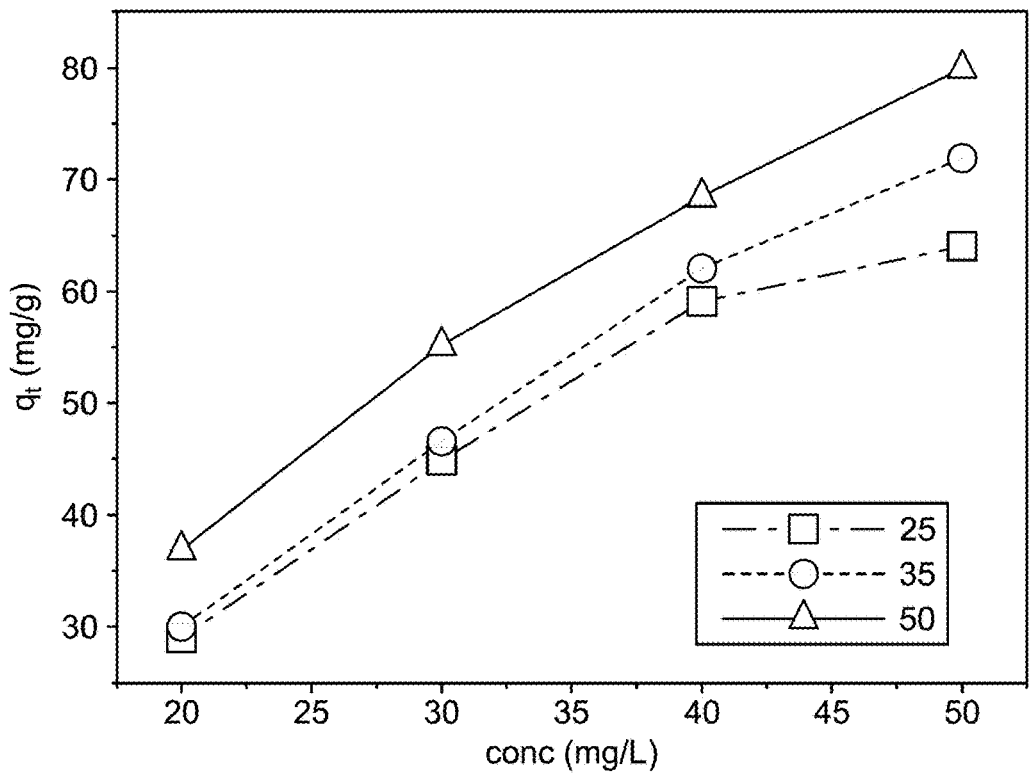
FIG. 5 is a graph depicting the performance of the $Co_2O_3$—$Bi_2O_3$@$SiO_2$ nanocomposite in adsorbing adsorption of ciprofloxacin (CIP) from 20, 30, 40, and 50 milligrams per liter (mg/L) aqueous solutions at 20, 35, and 50 degrees Celsius (° C.), according to certain embodiments.
Figure 6:
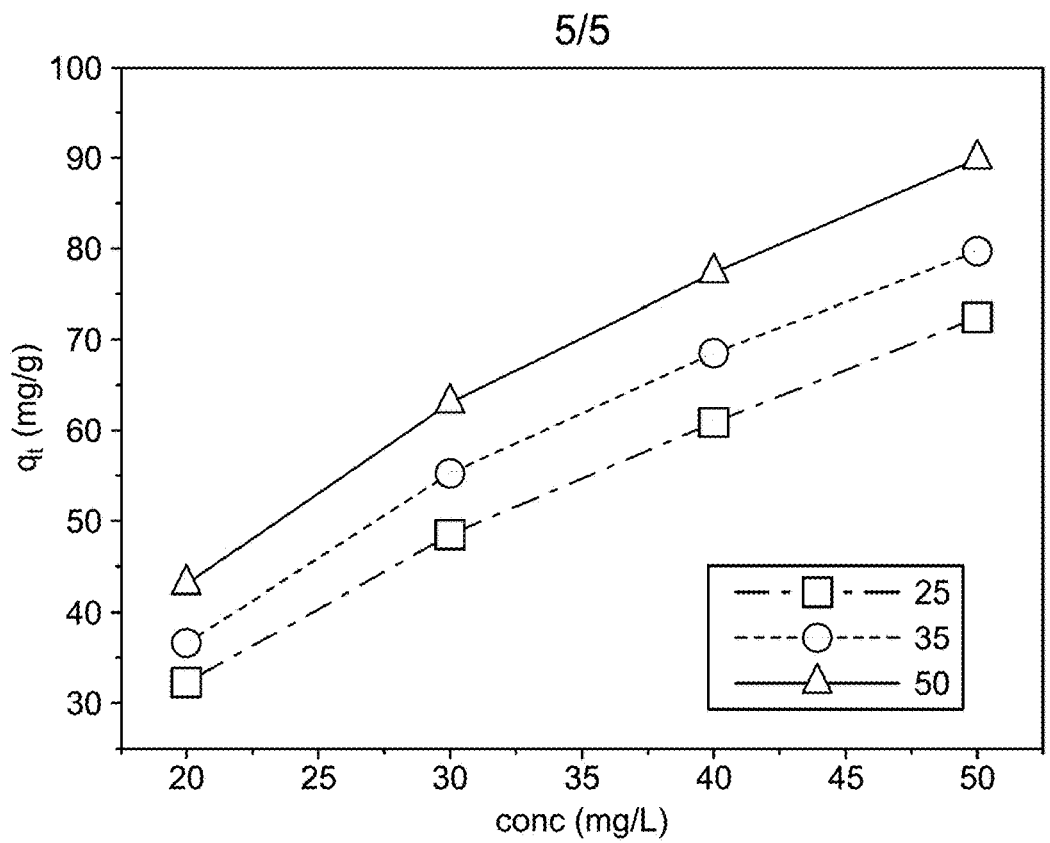
FIG. 6 is a graph depicting the performance of the $Co_2O_3$—$Bi_2O_3$@$SiO_2$ nanocomposite in adsorbing adsorption of indigo carmine (INC) from 20, 30, 40, and 50 mg/L aqueous solutions at 20, 35, and 50° C., according to certain embodiments.
Figure 7:
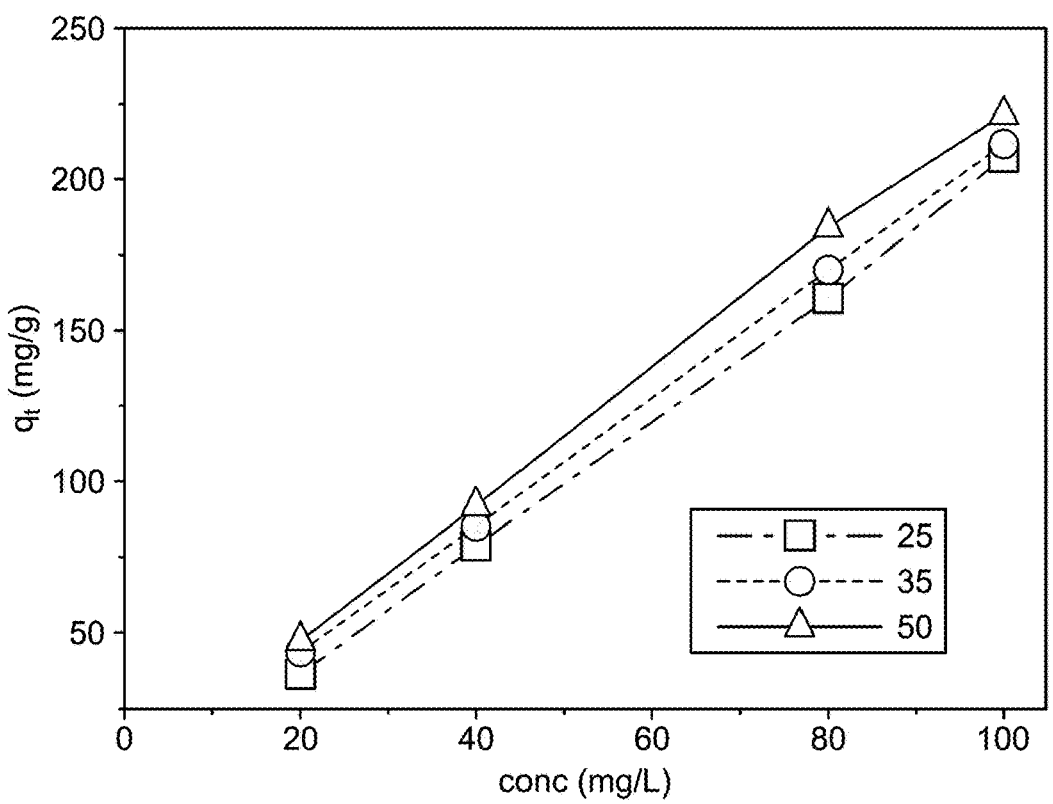
FIG. 7 is the graph depicting the performance of $Co_2O_3$—$Bi_2O_3$@$SiO_2$ nanocomposite in adsorbing adsorption of fuchsin (BFCN) from 20, 40, 80, and 100 mg/L aqueous solutions at 20, 35, and 50° C., according to certain embodiments.

The prepared $Co_2O_3$—$Bi_2O_3$@$SiO_2$ nanocomposite was applied for treating water contaminated by ciprofloxacin (CIP) drug, indigo carmine (INC), and fuchsin (BFCN) dye. The sorption on the prepared $Co_2O_3$—$Bi_2O_3$@$SiO_2$ nanocomposite was tested via batch protocol from solution concentrations ranging between 20 to 100 milligrams per liter (mg/L) for CIP and INC, while the BFCN was tested in the range of 20 to 100 mg/L. To assess the temperature effect, sorption was studied at 20° C., 35° C., and 50° C., as shown in FIG. 5, FIG. 6, and FIG. 7 for CIP, INC, and BFCN, respectively. The removal of the three pollutants improved as the temperature increased, indicating endothermic sorption. The treatment of the highest concentrations at 50° C. using the prepared $Co_2O_3$—$Bi_2O_3$@$SiO_2$ nanocomposite resulted in adsorption capacity values of 79.3, 89.1, and 220.4 milligrams per gram (mg·$g^{-1}$) for CIP, INC, and BFCN, respectively. The thermodynamic analysis indicated

The invention claimed is:

1. A $Co_2O_3$—$Bi_2O_3$@$SiO_2$ nanocomposite material, comprising: $Co_2O_3$—$Bi_2O_3$@$SiO_2$ nanocomposite particles having a granular morphology with an average diameter in a range from 10 to 30 nanometer (nm),
   wherein the $Co_2O_3$—$Bi_2O_3$@$SiO_2$ nanocomposite material has a Brunauer-Emmett-Teller (BET) surface area of greater than or equal to 70 square meters per gram ($m^2 \cdot g^{-1}$), and
   wherein the $Co_2O_3$—$Bi_2O_3$@$SiO_2$ nanocomposite material has an adsorption capacity for ciproflaxin of greater than or equal to 70 milligrams per gram ($mg \cdot g^{-1}$).

2. The $Co_2O_3$—$Bi_2O_3$@$SiO_2$ nanocomposite material of claim 1, wherein the $Co_2O_3$—$Bi_2O_3$@$SiO_2$ nanocomposite material has a Brunauer-Emmett-Teller (BET) surface area of greater than or equal to 75 $m^2 \cdot g^{-1}$.

3. The $Co_2O_3$—$Bi_2O_3$@$SiO_2$ nanocomposite material of claim 2, wherein the $Co_2O_3$—$Bi_2O_3$@$SiO_2$ nanocomposite material has a Brunauer-Emmett-Teller (BET) surface area of greater than or equal to 80 $m^2 \cdot g^{-1}$.

4. The $Co_2O_3$—$Bi_2O_3$@$SiO_2$ nanocomposite material of claim 1, wherein the $Co_2O_3$—$Bi_2O_3$@$SiO_2$ nanocomposite material has an average pore diameter in a range from 4 to 10 nm.

5. The $Co_2O_3$—$Bi_2O_3$@$SiO_2$ nanocomposite material of claim 4, wherein the $Co_2O_3$—$Bi_2O_3$@$SiO_2$ nanocomposite material has an average pore diameter in a range from 5 to 8.5 nm.

6. The $Co_2O_3$—$Bi_2O_3$@$SiO_2$ nanocomposite material of claim 5, wherein the $Co_2O_3$—$Bi_2O_3$@$SiO_2$ nanocomposite material has an average pore diameter in a range from 6.5 to 8 nm.

7. The $Co_2O_3$—$Bi_2O_3$@$SiO_2$ nanocomposite material of claim 1, wherein the $Co_2O_3$—$Bi_2O_3$@$SiO_2$ nanocomposite material has an average pore volume greater than or equal to 0.060 cubic centimeters per gram ($cm^3 \cdot g^{-1}$).

8. The $Co_2O_3$—$Bi_2O_3$@$SiO_2$ nanocomposite material of claim 7, wherein the $Co_2O_3$—$Bi_2O_3$@$SiO_2$ nanocomposite material has an average pore volume greater than or equal to 0.070 $cm^3 \cdot g^{-1}$.

9. The $Co_2O_3$—$Bi_2O_3$@$SiO_2$ nanocomposite material of claim 8, wherein the $Co_2O_3$—$Bi_2O_3$@$SiO_2$ nanocomposite material has an average pore volume greater than or equal to 0.080 $cm^3 \cdot g^{-1}$.

10. The $Co_2O_3$—$Bi_2O_3$@$SiO_2$ nanocomposite material of claim 1, wherein the $Co_2O_3$—$Bi_2O_3$@$SiO_2$ nanocomposite material has an adsorption capacity for ciproflaxin of greater than or equal to 75 $mg \cdot g^{-1}$.

11. The $Co_2O_3$—$Bi_2O_3$@$SiO_2$ nanocomposite material of claim 1, wherein the $Co_2O_3$—$Bi_2O_3$@$SiO_2$ nanocomposite material has an adsorption capacity for indigo carmine of greater than or equal to 75 $mg \cdot g^{-1}$.

12. The $Co_2O_3$—$Bi_2O_3$@$SiO_2$ nanocomposite material of claim 11, wherein the $Co_2O_3$—$Bi_2O_3$@$SiO_2$ nanocomposite material has an adsorption capacity for indigo carmine of greater than or equal to 85 $mg \cdot g^{-1}$.

13. The $Co_2O_3$—$Bi_2O_3$@$SiO_2$ nanocomposite material of claim 1, wherein the $Co_2O_3$—$Bi_2O_3$@$SiO_2$ nanocomposite material has an adsorption capacity for fuchsin of greater than or equal to 190 $mg \cdot g^{-1}$.

14. The $Co_2O_3$—$Bi_2O_3$@$SiO_2$ nanocomposite material of claim 13, wherein the $Co_2O_3$—$Bi_2O_3$@$SiO_2$ nanocomposite material has an adsorption capacity for fuchsin of greater than or equal to 210 $mg \cdot g^{-1}$.

15. The $Co_2O_3$—$Bi_2O_3$@$SiO_2$ nanocomposite material of claim 1, wherein the $Co_2O_3$@$Bi_2O_3SiO_2$ nanocomposite particles have an average diameter in a range from 12 to 25 nm.

16. A method of producing the $Co_2O_3$—$Bi_2O_3$@$SiO_2$ nanocomposite material of claim 1, comprising:
   sonicating bismuth nitrate pentahydrate in a nitric acid solution;
   adding water and stirring to form a first reaction mixture;
   boiling cobalt nitrate hexahydrate in ammonia solution under stirring to form a second reaction mixture;
   dispersing hydrophilic fumed silica and fructose powder in water using sonication and stirring to form a third reaction mixture;
   adding the first reaction mixture and the second reaction mixture to the third reaction mixture and stirring at 190 degrees Celsius (° C.) until visible water is evaporated to form a solid;
   drying the solid at 150° C. to form a dried solid;
   milling the dried solid to form a milled solid; and
   calcining the milled solid at a temperature in a range from 400 to 500° C. for 4 to 6 hours (h) to form the $Co_2O_3$—$Bi_2O_3$@$SiO_2$ nanocomposite material.

17. The method of claim 16, wherein the concentration of bismuth nitrate pentahydrate in the first reaction mixture is in a range from 0.03 to 0.05 molar (M), and the concentration of nitric acid in the first reaction mixture is in a range from 100 to 160 milliliters per liter (ml/L).

18. The method of claim 16, wherein the concentration of cobalt nitrate hexahydrate in the second reaction mixture is in a range from 0.03 to 0.05 M, and the concentration of ammonia in the second reaction mixture is in a range from 100 to 160 ml/L.

19. The method of claim 16, wherein the concentration of hydrophilic fumed silica in the third reaction mixture is in a range from 0.2 to 0.3 M, and the concentration of fructose powder in the third reaction mixture is in a range from 0.10 to 0.17 M.

20. The method of claim 16, wherein the milled solid is calcined at a temperature in a range from 425 to 475° C. for 5 hours.

* * * * *